United States Patent
Yuan et al.

(10) Patent No.: US 10,539,796 B1
(45) Date of Patent: Jan. 21, 2020

(54) SYSTEMS AND METHODS TO PROVIDE PRIVACY PROTECTION AND BRIGHTNESS ENHANCEMENT IN AN INTERACTIVE ENVIRONMENT

(71) Applicant: Meta View, Inc., San Mateo, CA (US)

(72) Inventors: Sheng Yuan, San Jose, CA (US); Ashish Ahuja, Mountainview, CA (US); Jie Xiang, Mountainview, CA (US)

(73) Assignee: Meta View, Inc., San Mateo, CA (US)

( * ) Notice: Subject to any disclaimer, the term of this patent is extended or adjusted under 35 U.S.C. 154(b) by 125 days.

(21) Appl. No.: 15/392,683

(22) Filed: Dec. 28, 2016

(51) Int. Cl.
| | |
|---|---|
| *G09G 3/02* | (2006.01) |
| *G02B 27/01* | (2006.01) |
| *G02B 27/28* | (2006.01) |
| *G06T 19/00* | (2011.01) |

(52) U.S. Cl.
CPC ....... *G02B 27/0172* (2013.01); *G02B 27/281* (2013.01); *G06T 19/006* (2013.01); *G09G 3/02* (2013.01); *G02B 2027/013* (2013.01); *G02B 2027/0118* (2013.01); *G09G 2358/00* (2013.01)

(58) Field of Classification Search
USPC .................................................. 345/156, 158
See application file for complete search history.

(56) References Cited

U.S. PATENT DOCUMENTS

| | | | | |
|---|---|---|---|---|
| 9,933,622 | B2 * | 4/2018 | Border | ................. B32B 37/24 |
| 2014/0198033 | A1 * | 7/2014 | Kobayashi | ........... G02B 27/017 |
| | | | | 345/156 |
| 2017/0219825 | A1 * | 8/2017 | Benoit | ............... G02B 27/0172 |
| 2017/0235143 | A1 | 8/2017 | Chi | |
| 2018/0035101 | A1 * | 2/2018 | Osterhout | ............ G02B 27/017 |
| 2018/0067319 | A1 * | 3/2018 | Border | ..................... G02B 5/30 |

* cited by examiner

*Primary Examiner* — Tony O Davis

(57) ABSTRACT

Described herein are systems and methods to provide privacy protection and brightness enhancement in an interactive environment. A system may include one or more of a headset, one or more light sources, one or more optical elements, one or more physical processor, and/or other components. A light source may be configured to generate linearly polarized light rays polarized on a first polarization plane along an axis of propagation. A reflective polarizer of an optical element may be configured to transmit light rays polarized on a second polarization plane transverse to the first polarization plane. Light rays polarized along the first polarization plane may be reflected off the reflective polarizer. An absorptive polarizer of an optical element may transmit light rays polarized on the second polarization plane so that light rays polarized along the second polarization plane may be transmitted through both the absorptive polarizer and the reflective polarizer.

18 Claims, 7 Drawing Sheets

US 10,539,796 B1

SYSTEMS AND METHODS TO PROVIDE PRIVACY PROTECTION AND BRIGHTNESS ENHANCEMENT IN AN INTERACTIVE ENVIRONMENT

FIELD OF THE INVENTION

The system and methods described herein relate to provide privacy protection and brightness enhancement in an interactive environment, such as an augmented reality environment and/or a virtual reality environment.

BACKGROUND OF THE INVENTION

There are many types of vision systems that provide virtual or augmented reality (AR) displays. In particular, wearable technology such as head mounted displays (HMD) are becoming more popular.

SUMMARY

One or more implementations of a system described herein facilitate providing views of virtual content (e.g., virtual objects in the form of three-dimensional digital imagery) in an interactive environment, such as one or both of a virtual reality environment and/or an augmented reality environment. An augmented reality environment may include views of images of virtual content superimposed over views of a real-world environment. A virtual reality environment may include views of images of virtual content within a virtual environment alone.

The system may include one or more of one or more physical processors, one or more light sources, one or more optical elements, a headset, and/or other components. One or more components of the system may be included with and/or otherwise held on the headset. The headset may be configured to be installed on a head of a user. By way of non-limiting illustration, headset may include one or more of a head-mounted display (HMD), glasses, and/or other devices.

An individual light source may be configured to generate linearly polarized light rays along an axis of propagation. The light rays may be linearly polarized on a polarization plane along the axis of propagation. One or more light sources may be arranged on a headset to direct linearly polarized light rays toward one or more optical elements. The one or more optical elements may be arranged on the headset such that, when the headset is installed on the head of the user, the user's gaze may be directed toward the one or more optical elements. The one or more optical elements may be arranged on the headset such that, when the headset is installed on the head of the user, the linearly polarized light rays generated by the light source may be directed onto the one or more optical elements to form images of virtual content on the one or more optical elements. The images of virtual content on the one or more optical elements may be superimposed over the user's view of the real world through the one or more optical elements to create an augmented reality environment.

In conventional AR implementations, an optical element may be provided in the form of a visor. The visor may facilitate reflection of projected images into the eyes of a user, as well as allow the user to view the real-world environment through the "lens" of the visor. In such implementations, in order to ensure a contrast between the images of virtual content and environmental ambient light, a dielectric coating on the visor may be used. Some privacy concerns may exist. In some instances, outside viewers (e.g., watching the user) may observe reversed-images of the virtual content that is intended only to reflect to the user's eye. This may cause private information leakage. In some instances, the projected light may be transmitted to the outside environment, reducing the brightness of the images of virtual content from the user's perspective. In some instances, outside viewers may observer the mirror image of the themselves and real-world environment reflected off the visor.

The system describe herein may provide one or more solutions to the privacy issues discussed above by implementing one or more of a reflective polarizer, an absorptive polarizer, and/or other components.

A reflective polarizer may be configured to transmit light rays polarized on a polarization plane that may be transverse to the polarization plane of a given light source. The light rays polarized along the polarization plane of a light source may be reflected off the reflective polarizer and directed toward one or more eyes of the user when the headset is installed on the head of the user. The reflective polarizer may enhance the reflection of images off the optical element so that the images may be brighter (e.g., fewer light rays may be leaked to the ambient environment) and/or may reduce or eliminate the observability of reversed images by an outside viewer.

An absorptive polarizer may be arranged downstream from a reflective polarizer with respect to the propagation of light rays generated by a given light source. The absorptive polarizer may be configured to transmit light rays polarized on the polarization plane that may be transverse to the polarization plane of the given light source. When the headset is installed on the head of the user, light rays from an ambient environment surrounding the user that are polarized along the transverse polarization plane and propagating toward the optical element may be transmitted through both the absorptive polarizer and the reflective polarizer to the one or more eyes of the user. The absorptive polarizer may reduce or eliminate reflection(s) an observer may see when looking at the headset.

These and other objects, features, and characteristics of the present disclosure, as well as the methods of operation and functions of the related components of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of any limits. As used in the specification and in the claims, the singular form of "a", "an", and "the" include plural referents unless the context clearly dictates otherwise.

DETAILED DESCRIPTION

Figure 1:
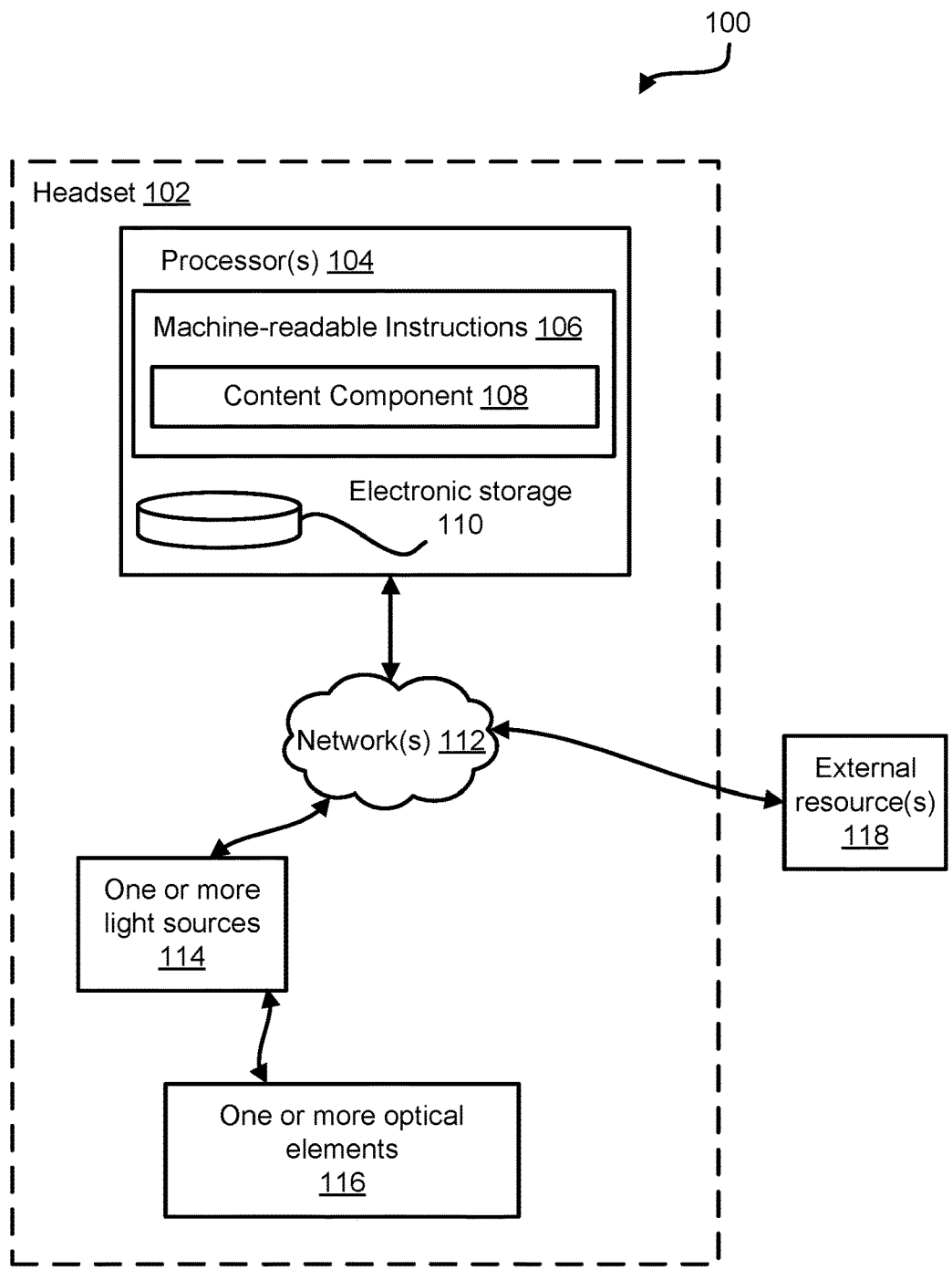
FIG. 1 illustrates a system configured to provide an interactive environment, in accordance with one or more implementations.

FIG. 1 shows a system 100 configured to provide an interactive environment, such as one or more of an augmented reality environment and/or an virtual reality environment. The human perceptual system has the ability to combine various sensory cues in an efficient manner in order to perceive "physically plausible" virtual content in a real-world environment. For example, the human perceptual system has the ability to integrate, among other things, sensory cues such as one or more of luminance, depth, and/or shape information to form or perceive coherent virtual content. Virtual content may include one or more virtual objects, and/or other content. As a result, the properties of the human perception may be exploited through visual systems, as described herein, employing hardware and/or software architectures to form virtual content (e.g., digital images) that may be located and/or perceived to be located in the real-world environment by virtue of the principles of the depth sensitive modules of the human brain. An augmented reality environment may include the views of the images of virtual content within a virtual environment superimposed over the views of the real-world environment. A virtual reality environment may include views of virtual content within a virtual environment alone.

The system 100 may include one or more of a headset 102, one or more physical processors 104, one or more light sources 114, one or more optical elements 116, a headset (not shown in FIG. 1) and/or other components. In some implementations, one or more components of system 100 may be included with and/or otherwise held on headset 102. The headset 102 may be configured to be installed (e.g., worn) on a head of a user. By way of non-limiting illustration, headset 102 may include one or more of a head-mounted display (HMD), glasses, and/or other devices.

Figure 10:
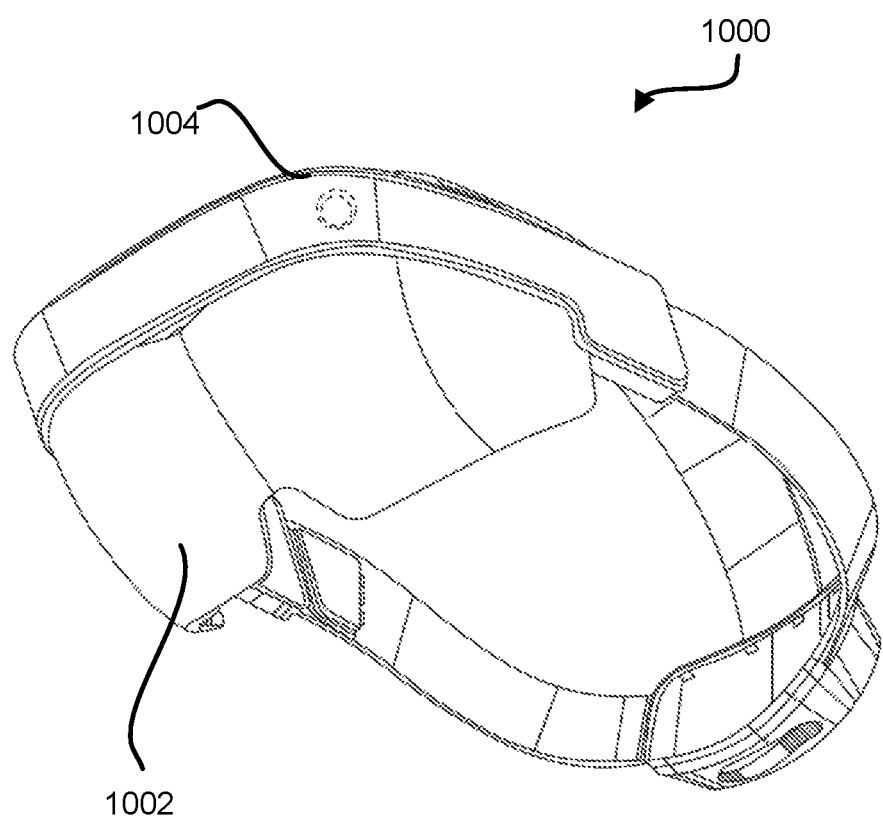
FIG. 10 illustrates an exemplary HMD, in accordance with one or more implementations.

By way of non-limiting illustration in FIG. 10, one or more optical elements may comprise at least part of a visor portion 1002 of an HMD 1000. One or more of one or more physical processors, one or more light sources, and/or other components may be incorporated into a frame portion 1004 of HMD 1000.

Returning to FIG. 1, in some implementations, individual light sources of one or more light sources 114 may be configured to generate linearly polarized light rays along an individual axis of propagation of the individual light sources. Light rays may be linearly polarized on a polarization plane along an axis of propagation. It is noted that the use of the term "light ray" is not intended to limit the scope of the disclosure to single, discrete, photons and/or packets of photons. Instead, the disclosure may envision a light ray to mean a light beam comprising multiple and continuous photons, in one or more implementations. In some implementations, a light ray may be envisioned to involve one or more light waves. A light wave may be defined by one or more of a frequency, a wavelength, an orientation (e.g., of polarization), and/or other features.

In some implementations, one or more light sources 114 may be arranged on headset 102 to direct linearly polarized light rays toward one or more optical elements 116. A light source may comprise one or more of a microelectromechanical systems (MEMS) RGB laser scanner, a microLED microdisplay, an LED illuminated liquid crystal on silicon (LCOS), an LED/RGB laser illuminated liquid crystal on silicon (LCOS), a digital light projector (DLP), a digital micromirror device (DMD), a liquid crystal display (LCD), an organic light-emitting diode (OLED) display, an OLED microdisplay, and/or other light sources.

In some implementations, a light source may generate light rays based on one or more color parameters of the light rays. Color parameters may include one or more of a first color parameter, a second color parameter, a third color parameter, and/or other color parameters. A value of a first color parameter may specify one or more of a luminous intensity, a chromaticity, a brightness, and/or other attributes of a first color. A value of a second color parameter may specify one or more of a luminous intensity, a chromaticity, a brightness, and/or other attributes of a second color. A value of a third color parameter may specify one or more of a luminous intensity, a chromaticity, a brightness, and/or other attributes of a third color. By way of non-limiting illustration, for an RGB laser, the first color may be red, the second color may be green, and/or the third color may be blue.

In some implementations, one or more optical elements 116 may be arranged on headset 102 such that, when the headset is installed on the head of the user, the user's gaze may be directed toward one or more optical elements 116. In some implementations, one or more optical elements 116 may be arranged on headset 102 such that, when the headset is installed on the head of the user, linearly polarized light rays generated by one or more light sources 114 may be directed onto one or more optical elements 116 to form images of virtual content on one or more optical elements 116. The images of virtual content on one or more optical elements 116 may be superimposed over the user's view of the real world through the one or more optical elements 116 to create an augmented reality environment.

Figure 9:
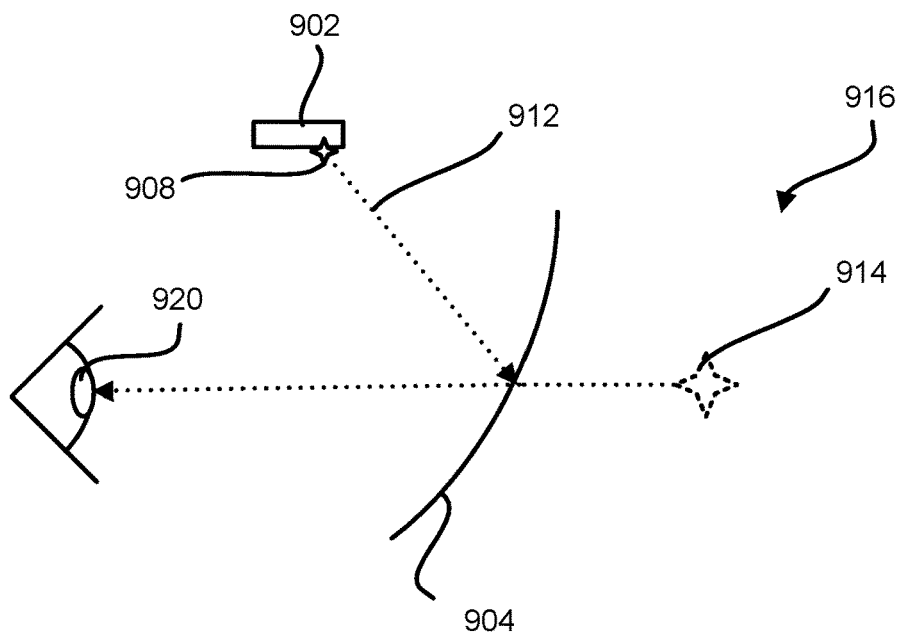
FIG. 9 illustrates an exemplary configuration of an optical element and a light source, in accordance with one or more implementations.

By way of non-limiting illustration in FIG. 9, an exemplary configuration of a light source 902 and optical element 904 is shown. The light source 902 may generate linearly polarized light rays, including light ray 912. The light ray 912 and/or other light rays may form images, including image 908, of virtual content that may be directed onto optical element 904. The image 908 of virtual content may be reflected off optical element 904 and into user's eye 920. The image 908 reflected off optical element 904 may be superimposed over the user's view (e.g., via eye 920) of the real world 916 through optical element 904 to create an augmented reality environment. For example, image 908 reflected off optical element 904 may create the augmented reality environment such that virtual content 914 (e.g., corresponding to the reflected image 908) may be perceived to be in the real world 916.

Returning to FIG. 1, in some implementations, an optical element may comprise one or more of one or more visors (not shown in FIG. 1), one or more reflective polarizers (not shown in FIG. 1), one or more absorptive polarizers (not shown in FIG. 1), and/or other components. Various configurations of an optical element are shown in FIGS. 5-8 and described herein.

In some implementations, a visor may comprise a curved structure and/or may have other shapes and/or forms. In some implementations, a curved visor may have one or more of a concave side surface, a convex side surface, a peripheral side edge, and/or other features. A visor may be formed from one or more transparent optical plastics and/or other materials. A visor may be injection-molded and/or formed by other techniques. The visor material may have a low birefringence, and also low thermal/stress induced birefringence (such as acrylic optical plastic), in order to avoid a rainbow effect under cross-polarizers. By way of non-limiting illustration, a visor may comprise one or more of ZEONEX, Cyclo Olefin Polymer (COP), Cyclic Olefin Copolymer (COC), polycarbonate, Poly (methyl methacrylate) (PMMA), and/or other materials.

In some implementations, a reflective polarizer may be deposited on, or comprise at least part of, a surface of a visor. A reflective polarizer may have high-polarization reflectivity over a broad spectrum and/or over a wide angle. A reflective polarizer may have a reflectivity of 80-100% and/or other ranges. By way of non-limiting illustration, a reflective polarizer may have a reflectivity of 90% and/or other values. A reflective polarizer may be one or more of laminated onto a visor surface, deposited onto a visor surface, self-assembled onto a visor surface, inject-molded onto a visor surface during fabrication of the visor, and/or formed in other ways. A reflective polarizer may comprise one or more of a coating, a film, a laminate, and/or other structures. A reflective polarizer may comprise one or more of a multi-layer birefringent film, a metal nano-wire film made by nano-printing and/or nano-lithography methods, a self-assembled metal nanowire film, and/or other structures.

In some implementations, light rays directed at an optical element by a light source may be directed at a reflective polarizer of the optical element. A reflective polarizer may be configured to transmit light rays polarized on a polarization plane that may be transverse to a polarization plane associated with a light source. In some implementations, transverse to a polarization plane may include orthogonal to a polarization plane. The light rays polarized along the polarization plane associated with the light source may be reflected off the reflective polarizer. The light rays reflected off the reflective polarizer may be directed toward one or more eyes of a user when the headset is installed on the head of the user. It is noted that reference to a polarization plane may refer to the orientation of the polarization plane of light rays when the light rays are incident on an optical element (e.g., as opposed to a polarization plane of the light rays having been reflected off the optical element). The polarization plane of light rays when the light rays are incident on an optical element may be referred to herein as the "polarization plane associated with a light source."

In some implementations, an absorptive polarizer may disposed on, or comprise at least part of, a surface of a visor. An absorptive polarizer may have high extinction ratio (e.g., greater than 500:1). An absorptive polarizer may have high polarization-transmittance with broadband wavelength (e.g., overall transmittance for un-polarized light may be larger than 42%). An absorptive polarizer may be one or more of laminated onto a visor surface, deposited onto a visor surface, self-assembled onto a visor surface, inject-molded onto a visor surface during fabrication of the visor, and/or formed in other ways. An absorptive polarizer may comprise one or more of a coating, a film, a laminate, and/or other structures.

In some implementations, an absorptive polarizer may be arranged on an optical element so that, when held along with a light source on a headset, the absorptive polarizer may be downstream from a reflective polarizer with respect to the propagation of light rays generated by the light source. That is, when a headset is installed on a head of a user, the reflective polarizer may be relatively closer to the user, and the absorptive polarizer may be relatively farther from the user (e.g., and nearest an ambient environment surrounding the user).

An absorptive polarizer may be configured to transmit light rays polarized on a polarization plane that may be transverse to a polarization plane associated with a light source. The absorptive polarizer may be configured to transmit light rays polarized on a polarization plane that may be the same or similar to a polarization plane permitted to transmit through a reflective polarizer. When a headset is installed on the head of the user, light rays from an ambient environment surrounding the user that may be polarized along the common polarization plane and propagating toward the optical element may be transmitted through both the absorptive polarizer and the reflective polarizer to the one or more eyes of the user. The communication of light rays through both polarizers, along with images of virtual content projected onto and reflected off the optical element, may create the augmented reality environment.

Figure 2:
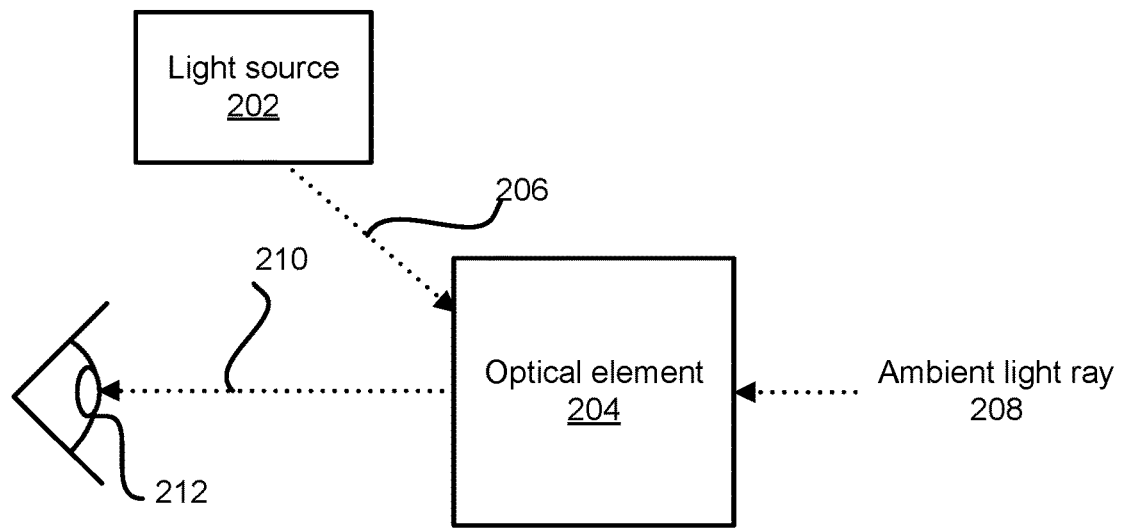
FIG. 2 illustrates an exemplary configuration of an optical element and a light source, in accordance with one or more implementations.

FIG. 2 illustrates a configuration of a light source 202 and an optical element 204, in accordance with one or more implementations. The light source 202 may be held on a headset (not shown in FIG. 2). The light source 202 may be configured to generate linearly polarized light rays along an axis of propagation. The light rays generated by light source 202 may be linearly polarized on a first polarization plane along the axis of propagation. The light rays generated by light source 202 may include linear polarized light ray 206 and/or other light rays. The optical element 204 may be held by the headset. The optical element 204 may be arranged on the headset such that (i) when the headset is installed on the head of the user, the user's gaze (e.g., line of sight from eye 212) may be directed toward optical element 204, and (ii) light ray 206 and/or other light rays generated by light source 202 may be directed onto optical element 204 to form images of virtual content on optical element 204. Light ray 206 polarized along the first polarization plane may be reflected off optical element 204 and directed toward eye 212 of the user when the headset is installed on the head of the user. The image formed on optical element 204 may be superimposed on the user's view of the real world through optical element 206 to create an augmented reality environment. Light rays from the ambient environment surrounding the user (e.g., including ambient light ray 208) that may be polarized along a specified polarization plane and propagating toward optical element 204 may be transmitted through optical element 204. Ambient light ray 208 and linear polarized light ray 206 may combine to form cumulative light rays 210 that may reach eye 212 of the user.

Figure 3:
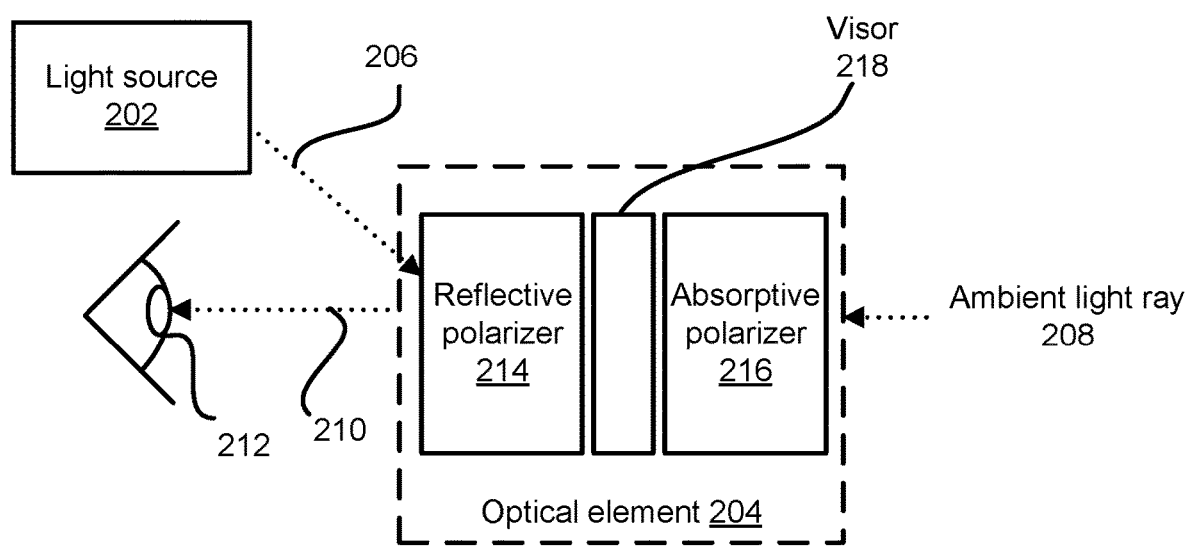
FIG. 3 illustrates an exemplary configuration of an optical element and a light source, in accordance with one or more implementations.

FIG. 3 illustrates a configuration of light source 202 and optical element 204 of FIG. 2 showing more detail of components of optical element 204. The optical element 204 may include one or more of a reflective polarizer 214, a visor 218, an absorptive polarizer 216, and/or other components. The reflective polarizer 214 may be configured to transmit light rays polarized on a second polarization plane that may be transverse to the first polarization plane. Light rays polarized along the first polarization plane may be reflected off reflective polarizer 214. Light rays reflected off reflective polarizer 214 may be directed toward eye 212 of the user when the headset is installed on the head of the user.

The absorptive polarizer 216 may be arranged downstream from reflective polarizer 214 with respect to the propagation of light rays (e.g., light ray 206) generated by light source 202. The absorptive polarizer 216 may be configured to transmit light rays polarized on the second polarization plane and/or other polarization planes. When the headset is installed on the head of the user, light ray 208 and/or other light rays from the ambient environment surrounding the user that are polarized along the second polarization plane and propagating toward optical element 204 may be transmitted through one or more of absorptive polarizer 216, visor 218, reflective polarizer 214 and/or other components to eye 212 of the user.

In some implementations, reflective polarizer 214 may be disposed on a first side surface of visor 218 and absorptive polarizer 216 may be disposed on a second side surface, opposite first side surface, of visor 218. Ambient light ray 208 may encounter absorptive polarizer 216 before encountering reflective polarizer 214. Other configurations of a reflective polarizer and absorptive polarizer with respect to one or more visors are shown in FIG. 5-8 and described herein.

Figure 4:
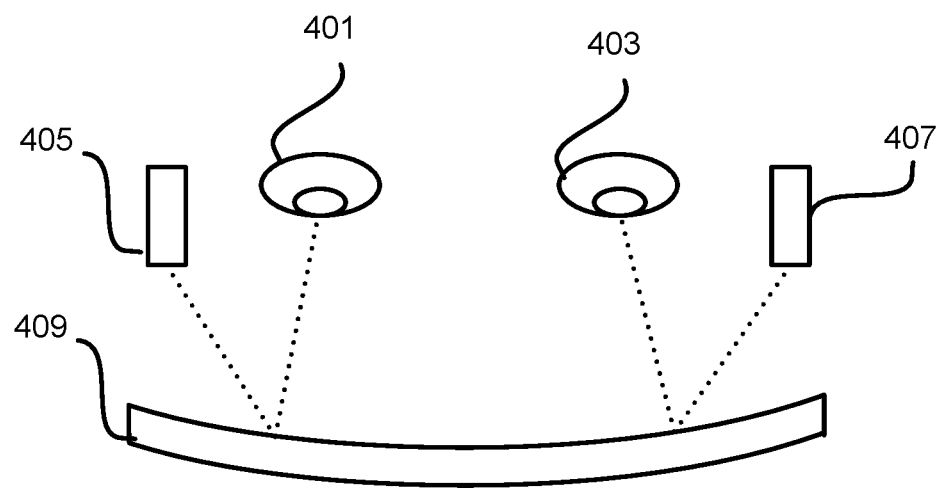
FIG. 4 illustrates an exemplary configuration of an optical element and a set of light sources, in accordance with one or more implementations.

FIG. 4 illustrates an exemplary configuration of an optical element 409 and a set of light sources. The set of light sources may include one or more of a first light source 405, a second light source 407, and/or other light sources. The optical element 409 and set of light sources may be held by a headset (not shown in FIG. 4). The first light source 405 may be held on a first side of the headset and configured to generate light rays to form images of virtual content for a first eye 401 of the user. The second light source 407 may be held on a second side of the headset and configured to generate light rays to form images of digital content for a second eye 403 of the user. In some implementations, optical element 409 may include a set of optical elements. For example, a first optical element may be held by a headset to align with a gaze of first eye 401 and a second optical element may be held by a headset to align with a gaze of second eye 403.

Figure 5:
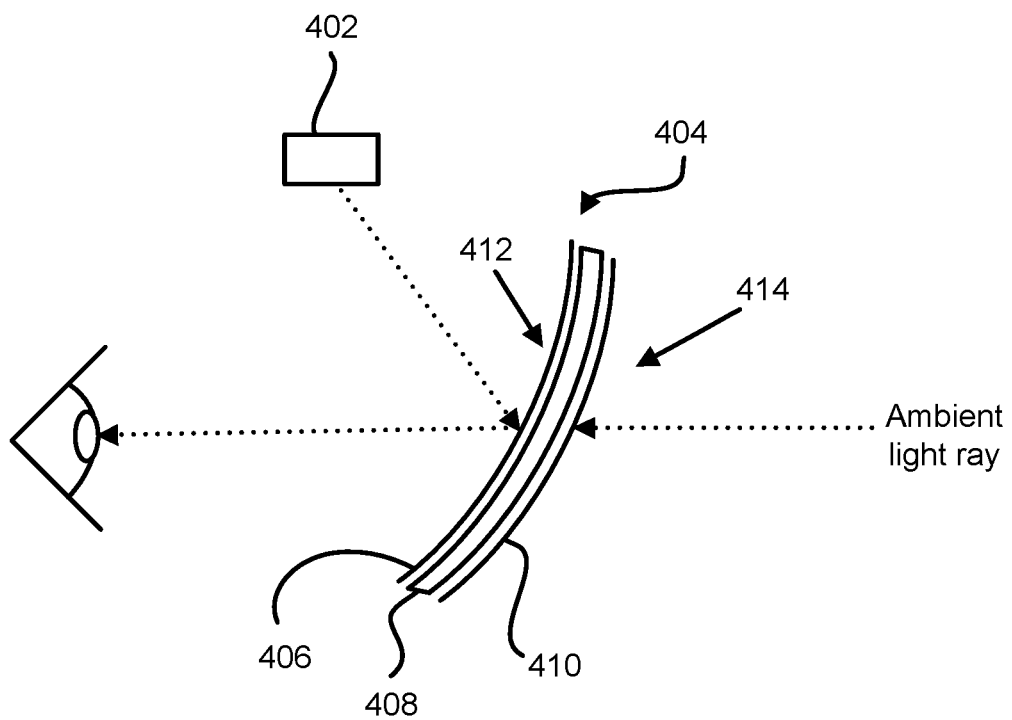
FIG. 5 illustrates an exemplary configuration of an optical element and a light source, in accordance with one or more implementations.

FIG. 5 illustrates a configuration of a light source 402 and an optical element 404, in accordance with one or more implementations. The light source 402 and/or optical element 404 may be held on a headset (not shown in FIG. 5). The optical element 404 may comprise one or more of a reflective polarizer 406, a visor 408, an absorptive polarizer 410, and/or other components. The visor 408 may comprise a curved visor having a concave side 412 and a convex side 414. The reflective polarizer 406 may be disposed on concave side 412 of visor 408. The absorptive polarizer 410 may be disposed on convex side 414 of visor 408.

Figure 6:
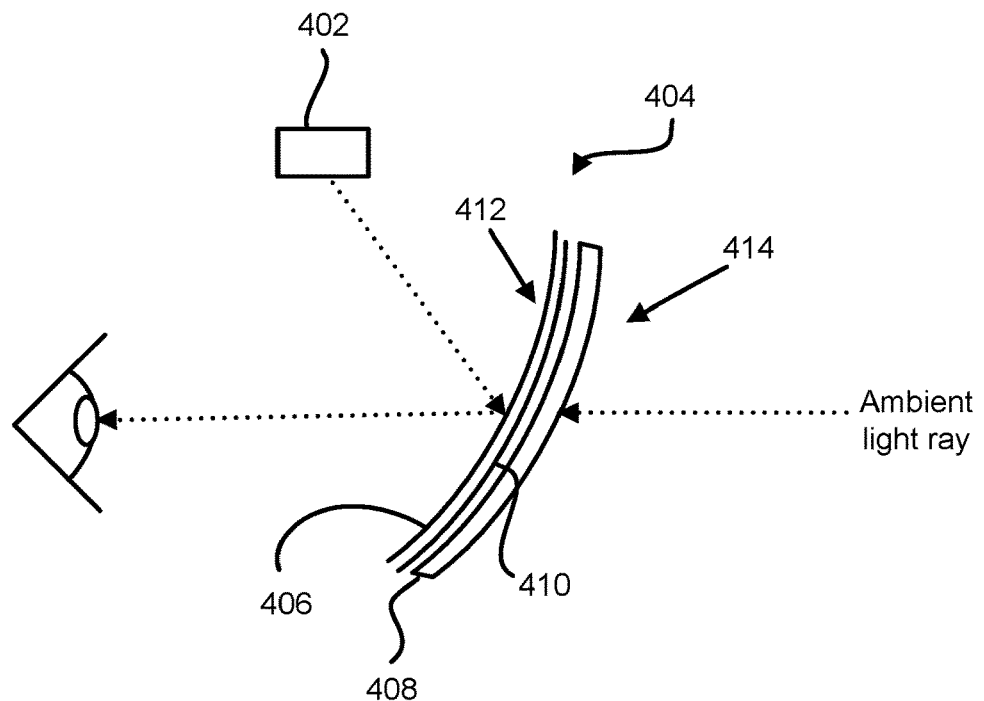
FIG. 6 illustrates an exemplary configuration of an optical element and a light source, in accordance with one or more implementations.

FIG. 6 illustrates another configuration of light source 402 and optical element 404, in accordance with one or more implementations. The reflective polarizer 406 may be disposed on concave side 412 of visor 408. The absorptive polarizer 410 may be disposed on concave side 412 of visor 408 between reflective polarizer 406 and visor 408.

Figure 7:
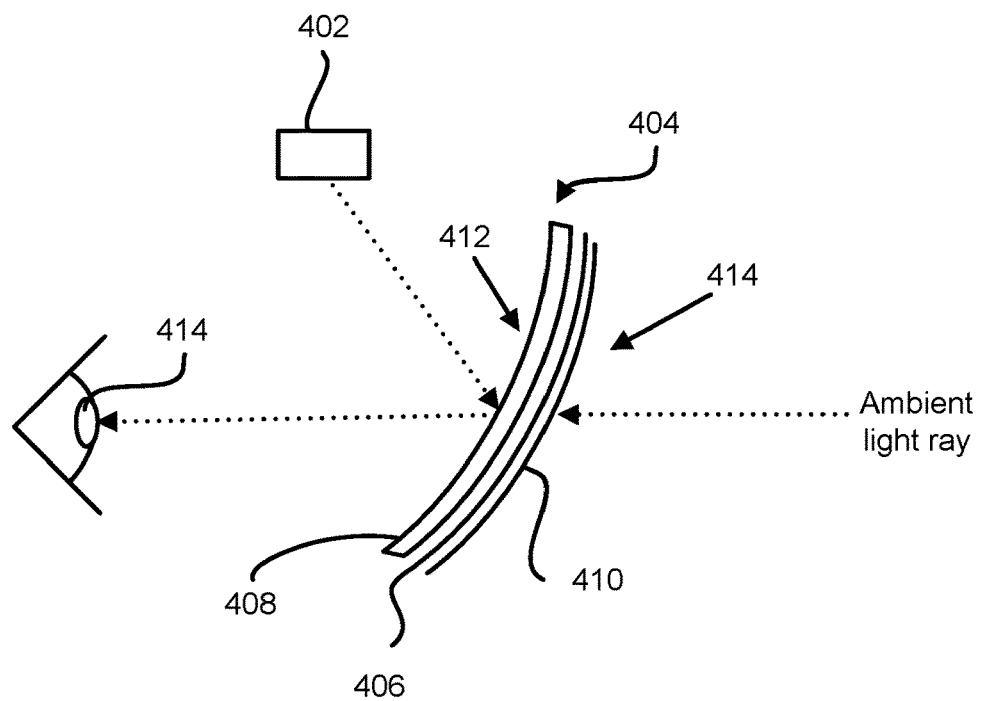
FIG. 7 illustrates an exemplary configuration of an optical element and a light source, in accordance with one or more implementations.

FIG. 7 illustrates another configuration of light source 402 and optical element 404, in accordance with one or more implementations. The reflective polarizer 406 may be disposed on convex side 414 of visor 408. The absorptive polarizer 410 may be disposed on convex side 414 of visor 408. The reflective polarizer 406 may be between visor 408 and absorptive polarizer 410.

Figure 8:
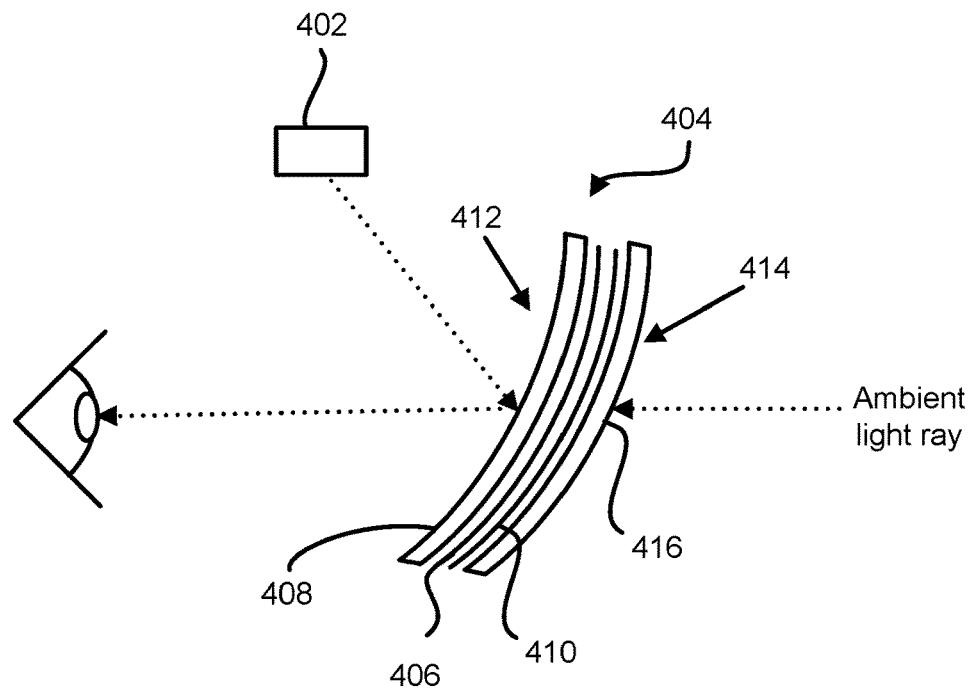
FIG. 8 illustrates an exemplary configuration of an optical element and a light source, in accordance with one or more implementations.

FIG. 8 illustrates another configuration of light source 402 and optical element 404, in accordance with one or more implementations. The optical element 404 may further include a second visor 416. The second visor 416 may comprise a curved visor. The reflective polarizer 406 may be disposed on convex side 414 of visor 408. The absorptive polarizer 410 may be disposed on concave side 412 of second visor 416. The reflective polarizer 406 and absorptive polarizer 410 may be between visor 408 and second visor 416.

Returning to FIG. 1, in some implementations, one or more physical processors 104 may be configured by machine-readable instructions 106. Executing machine-readable instructions 106 may cause one or more physical processors 104 to facilitate providing an interactive environment, such as one or both of an augmented reality environment and/or a virtual reality environment. The machine-readable instructions 106 may include one or more of a content component 108 and/or other components.

In some implementations, content component 108 may be configured to determine virtual content to present to a user. Virtual content may include one or more virtual objects and/or other virtual content. Virtual content may be in the form of digital imagery generated by one or more light sources 114.

In some implementations, content component 108 may be configured to control individual ones of one or more light sources 114. Individual ones of one or more light sources 114 may be controlled to generate linearly polarized light rays in accordance with images of virtual content to be perceived in an interactive environment.

In some implementations, controlling one or more light sources 114 and/or other components of system 100 may cause light rays to reflect off an optical element into a user's eye(s), wherein the user may perceive virtual content in three-dimensional space within their field-of-view of the real-world. The virtual content may be perceived by the viewing user to lie within three-dimensional real space at a range that may be equal to a range of a focal plane within the viewing user's field-of-view, and/or other ranges. By way of non-limiting illustration, a light source may generate light rays to form a digital image, which when reflected into a user's eyes, may be perceived as virtual content in three-dimensional space within the user's field-of-view of the real-world.

In some implementations, one or more of processor(s) 104, one or more light sources 114, external resources 118, and/or other components may be operatively linked via one or more electronic communication links. For example, such electronic communication links may be established, at least in part, via network(s) 112. Network(s) 112 may comprise one or both of wired or wireless communications. It will be appreciated that this is not intended to be limiting and that the scope of this disclosure includes implementations in which processor(s) 104, one or more light sources 114, external resources 118, and/or other components may be operatively linked via some other communication media.

The external resources 118 may include sources of information, hosts, external entities participating with system 100, providers of virtual content, and/or other resources. In some implementations, some or all of the functionality attributed herein to external resources 118 may be provided by resources included in headset 102.

The processor(s) 104 may include and/or have access to electronic storage 110, and/or other components. The processor(s) 104 may include communication lines or ports to enable the exchange of information with a network and/or other components of system 100. Illustration of processor(s) 104 in FIG. 1 is not intended to be limiting. The processor(s) 104 may include a plurality of hardware, software, and/or firmware components operating together to provide the functionality attributed herein to processor(s) 104. For example, processor(s) 104 may be implemented by a cloud of computing platforms operating together as processor(s) 104.

Electronic storage 110 may comprise electronic storage media that electronically stores information. The electronic storage media of electronic storage 110 may include one or both of system storage that is provided integrally (i.e., substantially non-removable) with processor(s) 104 and/or removable storage that is removably connectable to processor(s) 104 via, for example, a port or a drive. A port may include a USB port, a firewire port, and/or other port. A drive may include a disk drive and/or other drive. Electronic storage 110 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 110 may include one or more virtual storage resources (e.g., cloud storage, a virtual private network, and/or other virtual storage resources). Electronic storage 110 may store software algorithms, information determined by processor(s) 104, information received from other components of system 100, and/or other information that enables processor(s) 104 to function as described herein.

Processor(s) 104 is configured to provide information-processing capabilities. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor 104 may be configured to execute component 108 and/or other components. Processor(s) 104 may be configured to execute component 108 and/or other components by software; hardware; firmware; some combination of software, hardware, and/or firmware; and/or other mechanisms for configuring processing capabilities on processor(s) 104.

It should be appreciated that although component 108 and/or other components are illustrated in FIG. 1 as being co-located within a single processing unit, in implementations in which processor(s) 104 includes multiple processing units, one or more of components may be located remotely from the other components. The description of the functionality provided by an individual component is for illustrative purposes and is not intended to be limiting, as a given component may provide more or less functionality than is described. For example, a given component may be eliminated, and some or all of its functionality may be provided by another component. As another example, processor(s) 104 may be configured to execute one or more additional components that may perform some or all of the functionality attributed to one of component 108.

Figure 11:
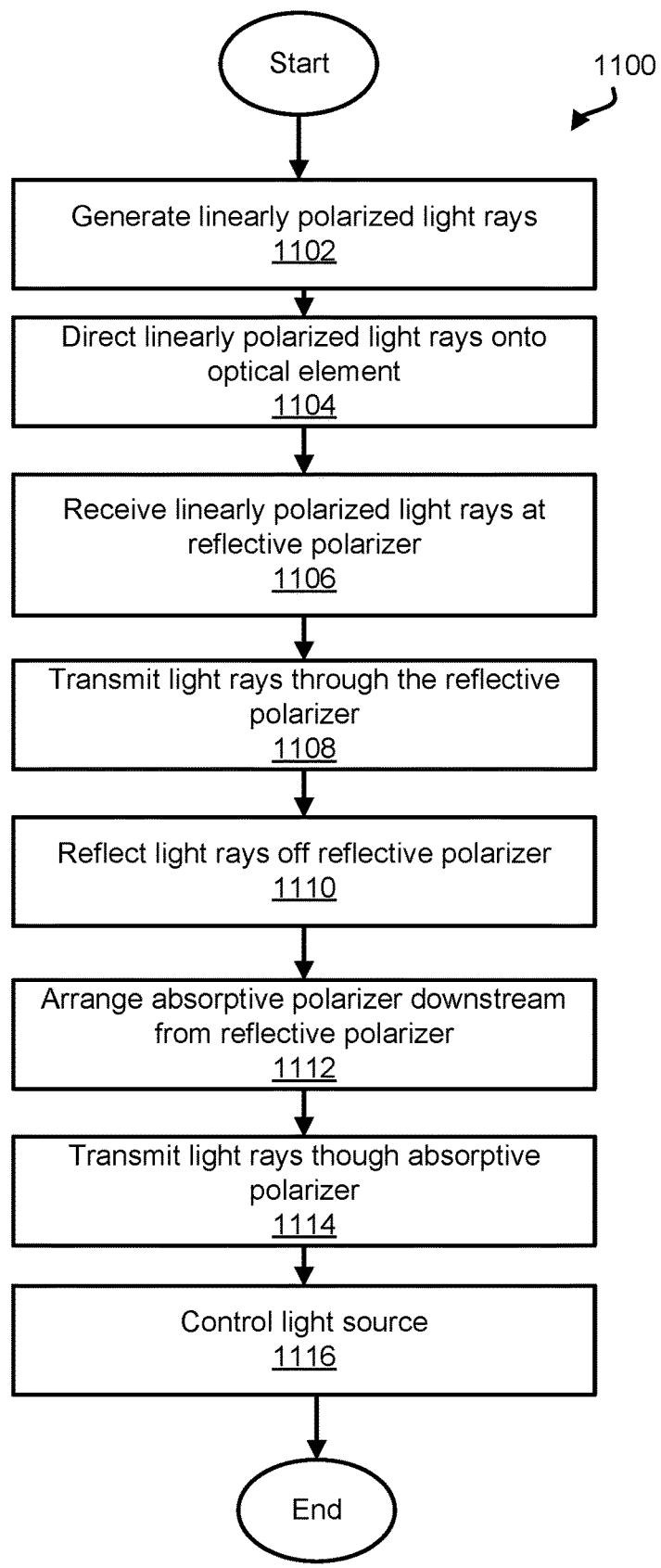
FIG. 11 illustrates a method of providing an interactive environment, in accordance with one or more implementations.

FIG. 11 illustrates a method 1100 of providing an interactive environment, in accordance with one or more implementations. The interactive environment may include one or more of a virtual reality environment, an augmented reality environment, and/or other interactive environments. The operations of method 1100 presented below are intended to be illustrative. In some implementations, method 1100 may be accomplished with one or more additional operations not described, and/or without one or more of the operations discussed. Additionally, the order in which the operations of method 1100 are illustrated in FIG. 11 and described below is not intended to be limiting.

In some implementations, method 1100 may be implemented in and/or using a system configured to provide an interactive environment, such as system 100 shown in FIG. 1 and described herein. In particular, method 1100 may be implemented in a headset configured to be installed on a head of a user, such as headset 102 shown in FIG. 1 and described herein. The headset may comprise one or more of a light source, an optical element, one or more physical processors, storage media storing machine-readable instructions, and/or other components. The optical element may be arranged on the headset such that when the headset is installed on the head of the user, the user's gaze may be directed toward the optical element. The one or more physical processors may include one or more devices executing one or more of the operations of method 1100 in response to instructions stored electronically on electronic storage media. The one or more processing devices may include one or more devices configured through hardware, firmware, and/or software to be specifically designed for execution of one or more of the operations of method 1100.

At an operation 1102, linearly polarized light rays may be generated along an axis of propagation. The light rays may be linearly polarized on a first polarization plane along the axis of propagation. In some implementations, operation 1102 may be performed using one or more light sources the same or similar to one or more lights sources 114 (shown in FIG. 1 and described herein).

At an operation 1104, linearly polarized light rays may be directed onto the optical element to form images of virtual content on the optical element. The images of the virtual content on the optical element may be superimposed over a view of the real world through the optical element to create the augmented reality environment. In some implementations, operation 1102 may be performed using one or more light sources the same or similar to one or more lights sources 114 and/or other components (shown in FIG. 1 and described herein).

At an operation 1106, linearly polarized light rays may be received at a reflective polarizer of the optical element. In some implementations, operation 1106 may be performed using an optical element the same as or similar to one or more optical elements 116 (shown in FIG. 1 and described herein).

At an operation 1108, light rays polarized on a second polarization plane may be transmitted through the reflective polarizer. The second polarization plane may be transverse to the first polarization plane. In some implementations, operation 1108 may be performed using an optical element the same as or similar to one or more optical elements 116 (shown in FIG. 1 and described herein).

At an operation 1110, light rays polarized along the first polarization plane may be reflected off the reflective polarizer and toward one or more eyes of the user when the headset is installed on the head of the user. In some implementations, operation 1110 may be performed using one or more optical elements the same as or similar to one or more optical elements 116 (shown in FIG. 1 and described herein).

At an operation 1112, an absorptive polarizer may be arranged downstream from the reflective polarizer with respect to the propagation of light rays generated by the light source. In some implementations, operation 1112 may be performed using one or more optical elements the same as or similar to one or more optical elements 116 (shown in FIG. 1 and described herein).

At an operation 1114, light rays polarized on the second polarization plane may be transmitted through the absorptive polarizer. When the headset is installed on the head of the user, light rays from an ambient environment surrounding the user that may be polarized along the second polarization plane and/or propagating toward the optical element may be transmitted through both the absorptive polarizer and the reflective polarizer to the one or more eyes of the user. In some implementations, operation 1114 may be performed using one or more optical elements the same as or similar to one or more optical elements 116 (shown in FIG. 1 and described herein).

At an operation 1116, one or more light sources may be controlled to generate linearly polarized light rays to form images of virtual content. In some implementations, operation 1116 may be performed by one or more physical processors executing a content component the same as or similar to content component 108 (shown in FIG. 1 and described herein).

Although the disclosed technology has been described in detail for the purpose of illustration based on what is currently considered to be the most practical and preferred implementations, it is to be understood that such detail is solely for that purpose and that the disclosure is not limited to any particular implementations, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system configured to provide an augmented reality environment, the system comprising:
   a headset configured to be worn on a head of a user;
   a light source held on the headset configured to generate linearly polarized light rays along an axis of propagation, the light rays being linearly polarized on a first polarization plane along the axis of propagation;
   an optical element held by the headset, the optical element being arranged on the headset such that (i) when the headset is worn on the head of the user, the user's gaze is directed toward the optical element, and (ii) the linearly polarized light rays generated by the light source are directed onto the optical element to form images of virtual content on the optical element that are superimposed over a view of the real world through the optical element to create an augmented reality environment, the optical element comprising:
   a reflective polarizer, the reflective polarizer being configured to transmit light rays polarized on a second polarization plane that is transverse to the first polarization plane so that light rays polarized along the first polarization plane are reflected off the reflective polarizer and directed toward one or more eyes of the user when the headset is installed on the head of the user; and
   an absorptive polarizer, the absorptive polarizer being arranged downstream from the reflective polarizer with respect to the propagation of light rays generated by the light source, the absorptive polarizer being configured to transmit light rays polarized on the second polarization plane so that when the headset is installed on the head of the user, light rays from an ambient environment surrounding the user that are polarized along the second polarization plane and propagating toward the optical element are transmitted through both the absorptive polarizer and the reflective polarizer to the one or more eyes of the user; and
   one or more physical processors configured by machine-readable instructions to:
   control the light source to generate the linearly polarized light rays to form the images of the virtual content;
   wherein:
   the optical element comprises a curved visor having a concave side and a convex side; and
   the reflective polarizer and the absorptive polarizer are both disposed on either the concave side or the convex side.

2. The system of claim 1, wherein:
   the reflective polarizer is disposed on the concave side of the visor; and
   the absorptive polarizer is disposed on the concave side of the visor between the reflective polarizer and the visor.

3. The system of claim 1, wherein:
   the reflective polarizer is disposed on the convex side of the visor;
   the absorptive polarizer is disposed on the convex side of the visor; and
   the reflective polarizer is between the visor and the absorptive polarizer.

4. The system of claim 1, wherein:
   the optical element comprises the curved first visor and a curved second visor;
   the reflective polarizer is disposed on a convex side of the curved visor;
   the absorptive polarizer is disposed on a concave side of the curved second visor; and
   wherein the reflective polarizer and the absorptive polarizer are between the curved visor and the curved second visor.

5. The system of claim 1, wherein the reflective polarizer comprises one or more of a multi-layer birefringent film or a metal nano-wire film.

6. The system of claim 1, wherein the optical element further comprises a visor, and wherein the absorptive polarizer and reflective polarizer are formed on respective surfaces of the visor by one or more of laminating, depositing, self-assembling, or injection molding.

7. The system of claim 1, wherein the headset comprises a head-mounted display.

8. The system of claim 1, wherein the light source is one or more of a microelectromechanical systems (MEMS) RGB laser scanner, a microLED microdisplay, an LED/RGB laser illuminated liquid crystal on silicon (LCOS), a digital light projector (DLP), a digital micromirror device (DMD), a liquid crystal display (LCD), an organic light-emitting diode (OLED) display, or an OLED mircodisplay.

9. The system of claim 1, wherein the one or more physical processors are held on the headset.

10. A method of providing an augmented reality environment, the method being implemented in a headset configured to be worn on a head of a user, the headset comprising a light source, an optical element, one or more physical processors, and storage media storing machine-readable instructions, the optical element being arranged on the headset such that when the headset is worn on the head of the user, the user's gaze is directed toward the optical element, the method comprising:
generating, using the light source, linearly polarized light rays along an axis of propagation, the light rays being linearly polarized on a first polarization plane along the axis of propagation;
directing the linearly polarized light rays onto the optical element to form images of virtual content on the optical element, the images of the virtual content on the optical element being superimposed over a view of the real world through the optical element to create the augmented reality environment;
receiving the linearly polarized light rays at a reflective polarizer of the optical element;
transmitting light rays polarized on a second polarization plane through the reflective polarizer, the second polarization plane being transverse to the first polarization plane;
reflecting the light rays polarized along the first polarization plane off the reflective polarizer and directing the reflected light rays toward one or more eyes of the user when the headset is installed on the head of the user;
arranging an absorptive polarizer downstream from the reflective polarizer with respect to the propagation of light rays generated by the light source;
transmitting light rays polarized on the second polarization plane through the absorptive polarizer so that when the headset is installed on the head of the user, light rays from an ambient environment surrounding the user that are polarized along the second polarization plane and propagating toward the optical element are transmitted through both the absorptive polarizer and the reflective polarizer to the one or more eyes of the user; and
controlling the light source to generate the linearly polarized light rays to form the images of the virtual content; wherein:
the optical element comprises a curved visor having a concave side and a convex side; and
the reflective polarizer and the absorptive polarizer are both disposed on either the concave side or the convex side.

11. The method of claim 10, further comprising:
arranging the reflective polarizer on the concave side of the visor; and
arranging the absorptive polarizer on the concave side of the visor between the reflective polarizer and the visor.

12. The method of claim 10, further comprising:
arranging the reflective polarizer on the convex side of the visor;
arranging the absorptive polarizer on the convex side of the visor; and
arranging the reflective polarizer between the visor and the absorptive polarizer.

13. The method of claim 10, wherein:
transmitting light rays through the curved visor and a curved second visor;
arranging the reflective polarizer on the convex side of the first visor;
arranging the absorptive polarizer on a concave side of the second visor; and
arranging the reflective polarizer and the absorptive polarizer between the first visor and the second visor.

14. The method of claim 10, wherein the reflective polarizer comprises one or more of a multi-layer birefringent film or a metal nano-wire film.

15. The method of claim 10, further comprising:
forming the absorptive polarizer on a first side surface of a visor; and,
forming the reflective polarizer on a second side surface of the visor.

16. The method of claim 10, wherein the headset comprises a head-mounted display.

17. The method of claim 10, wherein the light source is one or more of a microelectromechanical systems (MEMS) RGB laser scanner, a microLED microdisplay, an LED/RGB laser illuminated liquid crystal on silicon (LCOS), a digital light projector (DLP), a digital micromirror device (DMD), a liquid crystal display (LCD), an organic light-emitting diode (OLED) display, or an OLED mircodisplay.

18. The method of claim 10, wherein the controlling of the light source to generate the linearly polarized light rays to form the virtual content is performed using one or more physical processors held on the headset.

* * * * *